(12) United States Patent
Gopalan et al.

(10) Patent No.: US 9,548,944 B2
(45) Date of Patent: Jan. 17, 2017

(54) SYSTEMS, APPARATUS, AND METHODS FOR NON-BLOCKING SWITCH NETWORKS

(71) Applicant: Infinera Corporation, Annapolis Junction, MD (US)

(72) Inventors: Abishek Gopalan, San Jose, CA (US); Biao Lu, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 93 days.

(21) Appl. No.: 14/302,079

(22) Filed: Jun. 11, 2014

(65) Prior Publication Data
US 2015/0244647 A1 Aug. 27, 2015

Related U.S. Application Data

(60) Provisional application No. 61/945,433, filed on Feb. 27, 2014.

(51) Int. Cl.
H04L 12/933 (2013.01)
H04L 12/931 (2013.01)

(52) U.S. Cl.
CPC ............ *H04L 49/15* (2013.01); *H04L 49/201* (2013.01)

(58) Field of Classification Search
CPC ......... H04L 49/15; H04L 12/28; H04L 49/201
See application file for complete search history.

(56) References Cited

U.S. PATENT DOCUMENTS

| 4,807,280 | A | | 2/1989 | Posner et al. | |
|---|---|---|---|---|---|
| 5,179,551 | A | | 1/1993 | Turner | |
| 5,414,706 | A | * | 5/1995 | Muhr | H04Q 3/68 370/380 |
| 5,631,902 | A | * | 5/1997 | Yoshifuji | H04J 3/14 340/2.24 |
| 6,982,974 | B1 | * | 1/2006 | Saleh | H04L 49/1515 340/2.2 |
| 7,260,092 | B2 | * | 8/2007 | Dally | H04Q 3/68 370/369 |
| 8,495,194 | B1 | * | 7/2013 | Brar | H04L 49/1515 370/216 |
| 9,225,666 | B1 | * | 12/2015 | Aybay | H04L 49/15 |
| 2001/0053160 | A1 | * | 12/2001 | Dally | H04Q 3/68 370/535 |

(Continued)

OTHER PUBLICATIONS

Hwang, F.K. "The mathematical theory of nonblocking switching networks." CH 4.3.

(Continued)

*Primary Examiner* — Paul H Masur
(74) *Attorney, Agent, or Firm* — David L. Soltz

(57) ABSTRACT

A switch network may include a plurality of switch stages arranged in sequential stages. The plurality of switch stages may include a first switch stage connected to a plurality of inputs, a second switch stage connected to each switch in the first switch stage, a third switch connected to each switch in the second switch stage, a fourth switch stage connected to each of the switches in the third switch stage, and a fifth switch stage connected to a plurality of outputs and each switch in the fourth switch stage, and a control element configured to control each of the plurality of switch stages for routing a signal from one of the plurality of inputs to one of the plurality of outputs.

12 Claims, 14 Drawing Sheets

(56) References Cited

U.S. PATENT DOCUMENTS

| | | | | |
|---|---|---|---|---|
| 2003/0021267 A1* | 1/2003 | Wu | ................... | H04L 49/1515 |
| | | | | 370/388 |
| 2003/0058848 A1* | 3/2003 | Dally | ...................... | H04Q 3/68 |
| | | | | 370/360 |
| 2005/0117575 A1* | 6/2005 | Konda | ................... | H04L 12/28 |
| | | | | 370/389 |
| 2011/0123014 A1* | 5/2011 | Smith | ................. | H04L 49/1515 |
| | | | | 379/242 |

OTHER PUBLICATIONS

Kirkpatrick, D.G. et al "Some graph-coloring theorems with applications to generalized connection networks." Siam J. Alg. Disc. Math., vol. 6, No. 4, pp. 576-582, Oct. 1985.

Yang, Y. et al. "Nonblocking Broadcast Switching Networks." IEEE Transactions on Computers, vol. 40, No. 9, Sep. 1991.

Turner, J.S. "Practical Wide-sense No-blocking Generalized Connectors." WUCS-88-29, pp. 1-6. http://www.arl.wustl.edu/~jst/pubs/1988/wucs-88-29.pdf.

Turner, J.S. "Multirate Clos Networks." IEEE Communications Magazine, Oct. 2003, pp. 1-11. http://www.arl.wustl.edu/Publications/2000-04/commMag03.pdf.

* cited by examiner

SYSTEMS, APPARATUS, AND METHODS FOR NON-BLOCKING SWITCH NETWORKS

CROSS-REFERENCE TO RELATED APPLICATION

The present application for patent claims the benefit of U.S. Provisional Application No. 61/945,433, entitled "REARRANGEABLY NON-BLOCKING MULTICAST CLOS NETWORK," filed Feb. 27, 2014, assigned to the assignee hereof, and expressly incorporated herein by reference in its entirety.

FIELD OF DISCLOSURE

This disclosure relates generally to switch networks, and more specifically, but not exclusively, to rearrangeable non-blocking switch networks.

BACKGROUND

Multicast is an operation to transmit information to multiple destinations, and is a requirement in high-performance networks. Many networking/computing applications exhibit the need for such multicast communication patterns. For example, audio/video multimedia conferencing, distance education, and video-on-demand services in a communication network, matrix multiplication and barrier synchronization in parallel/distributed computing systems, and record updates in a distributed database.

The network we consider is an N×N network that has N inputs and N outputs, and consists of one or more stages of switch modules. In a network, you generally have three types of communication—unicast, broadcast, and multicast. Unicast is the term used to describe communication where a piece of information is sent from one point to another point. In this case there is just one sender, and one receiver. Unicast transmission, in which a packet is sent from a single source to a specified destination, is the predominant form of transmission on LANs and within the Internet. All LANs (e.g. Ethernet) and IP networks support the unicast transfer mode, and most users are familiar with the standard unicast applications (e.g. http, smtp, ftp and telnet) which employ the TCP transport protocol.

Broadcast is the term used to describe communication where a piece of information is sent from one point to all other points. In this case there is just one sender, but the information is sent to all connected receivers. Broadcast transmission is supported on most LANs (e.g. Ethernet), and may be used to send the same message to all computers on the LAN (e.g. the address resolution protocol (arp) uses this to send an address resolution query to all computers on a LAN). Network layer protocols (such as IPv4) also support a form of broadcast that allows the same packet to be sent to every system in a logical network (in IPv4 this consists of the IP network ID and an all 1's host number).

Multicast is the term used to describe communication where a piece of information is sent from one or more points to a set of other points. In this case there is may be one or more senders, and the information is distributed to a set of receivers (there may be no receivers, or any other number of receivers). One example of an application which may use multicast is a video server sending out networked TV channels. Simultaneous delivery of high quality video to each of a large number of delivery platforms will exhaust the capability of even a high bandwidth network with a powerful video clip server. This poses a major scalability issue for applications which required sustained high bandwidth. One way to significantly ease scaling to larger groups of clients is to employ multicast networking.

Thus, multicasting is the networking technique of delivering the same packet simultaneously to a group of clients. IP multicast provides dynamic many-to-many connectivity between a set of senders (at least 1) and a group of receivers. The format of IP multicast packets is identical to that of unicast packets and is distinguished only by the use of a special class of destination address (class D IPv4 address) which denotes a specific multicast group. Since TCP supports only the unicast mode, multicast applications must use the UDP transport protocol.

Unlike broadcast transmission (which is used on some local area networks), multicast clients receive a stream of packets only if they have previously elect to do so (by joining the specific multicast group address). Membership of a group is dynamic and controlled by the receivers (in turn informed by the local client applications). The routers in a multicast network learn which sub-networks have active clients for each multicast group and attempt to minimize the transmission of packets across parts of the network for which there are no active clients.

The multicast mode is useful if a group of clients require a common set of data at the same time, or when the clients are able to receive and store (cache) common data until needed. Where there is a common need for the same data required by a group of clients, multicast transmission may provide significant bandwidth savings (up to 1/N of the bandwidth compared to N separate unicast clients).

The majority of installed LANs (e.g. Ethernet) are able to support the multicast transmission mode. Shared LANs (using hubs/repeaters) inherently support multicast, since all packets reach all network interface cards connected to the LAN. The earliest LAN network interface cards had no specific support for multicast and introduced a big performance penalty by forcing the adaptor to receive all packets (promiscuous mode) and perform software filtering to remove all unwanted packets. Most modern network interface cards implement a set of multicast filters, relieving the host of the burden of performing excessive software filtering.

For the purposes of this application, we define a valid multicast connection in such a switching network as a connection that the source of the multicast is an idle input of the network, and each destination of the multicast is an idle output of the network. Hereinafter, we simply refer to it as a multicast connection.

A multicast assignment is a collection of multicast connections with no overlapping allowed among the destinations of different sources. In a multicast assignment, the number of destinations from the same source is referred to as the fan-out of the source. A one-to-one mapping between the network inputs and outputs is a special case of a multicast assignment where the fan-out of each source is exactly one. Switching networks that can realize all possible multicast assignments are referred to as multicast switching networks. Moreover, a multicast switching network can be strictly nonblocking, wide-sense nonblocking, or rearrangeable. In a strictly nonblocking multicast network, any new multicast connection from a source to its destinations can be realized without any disturbance to existing connections in the network. In a wide-sense nonblocking multicast network, any new multicast connection from a source to its destinations can also be realized without any disturbance to existing connections in the network, given that the routing always follows a routing-control strategy. In a rearrangeable multicast network, rearrangements of on-going connections in the network may be needed to realize a new multicast connection.

Traditionally, the hardware cost of a switching network is measured by the number of its crosspoints. In general, an a×b switch has a×b crosspoints. The simplest design for a N×N nonblocking switching network is to adopt an N×N crossbar, which has $N^2$ crosspoints. However, this hardware cost would be too high as N becomes large. Adopting a multistage network is a common approach to reducing the hardware cost of a switching network, since each stage of the network consists of smaller crossbars, and the total number of crosspoints of the network is much lower than that of an N×N crossbar.

The Clos-type network is a special type of multistage switching network with the following structural properties. For each switch module in a stage (except the last stage) of the network, its outputs are linked to all the switch modules in the next stage, with each output linked to a switch module and no two outputs linked to the same switch module. A typical three-stage Clos network has r switch modules of size n×m in the input stage, m switch modules of size r×r in the middle stage, and r switch modules of size m×n in the output stage with N=n×r and m>=n. The hardware cost of the network in terms of the number of crosspoints is {r×n×m+m×r$^2$+r×m×n=m (2N+r$^2$)}, which is proportional to m, the number of switch modules in the middle stage. Since the cost depends on all the terms that make up the total crosspoint count and depends on m, n, and r, minimizing the value of m may achieve low hardware cost for a three-stage Clos network. Alternatively, you can minimize n and or r as well assuming the other terms don't increase as a result.

Accordingly, there are long-felt industry needs for methods that improve upon conventional methods including the improved systems, methods and apparatus disclosed herein.

The features that are characteristic of the teachings, together with further objects and advantages, are better understood from the detailed description and the accompanying figures. Each of the figures is provided for the purpose of illustration and description only, and does not limit the present teachings.

SUMMARY

The following presents a simplified summary relating to one or more aspects and/or exemplary implementations of the apparatus, systems and methods disclosed herein. As such, the following summary should not be considered an extensive overview relating to all contemplated aspects and/or implementations, nor should the following summary be regarded to identify key or critical elements relating to all contemplated aspects and/or implementations or to delineate the scope associated with any particular aspect and/or implementation. Accordingly, the following summary has the sole purpose to present certain concepts relating to one or more aspects and/or implementations relating to the apparatus, systems and methods disclosed herein in a simplified form to precede the detailed description presented below.

Some exemplary implementations of the disclosure are directed to systems, apparatus, and methods for optical communication. It should be understood that the inventive concepts described herein are applicable in other industries as well as other communication applications.

According to some implementations: the system, apparatus, and method may include a first switch stage connected to inputs and having a plurality of first switches; a second switch stage having a plurality of second switches with each of the plurality of second switches connected to each of the plurality of first switches; a third switch stage having a plurality of third switches connected to each of the plurality of second switches; a fourth switch stage having a plurality of fourth switches connected to each of the of the plurality of third switches; a fifth switch stage connected to a plurality of outputs and each of the plurality of fourth switches; and a control element configured to control each of the switch stages for routing a signal from one of the inputs to one of the outputs.

According to some implementations: the system, apparatus, and method for routing a signal through a switch may include inputting a multicast signal in an input stage of a plurality of switch stages; routing the multicast signal in a unicast manner to a middle stage of the plurality of switch stages; and routing the signal in a unicast manner to an output stage of the plurality of switch stages according to a fan out criteria of the multicast signal.

Other objects and advantages associated with the apparatus and methods disclosed herein will be apparent to those skilled in the art based on the accompanying drawings and detailed description.

BRIEF DESCRIPTION OF THE DRAWINGS

The accompanying drawings are presented to describe examples of the present teachings, and are not limiting. The accompanying drawings are presented to aid in the description of implementations of the disclosure and are provided solely for illustration of the implementations and not limitation thereof.

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1A:
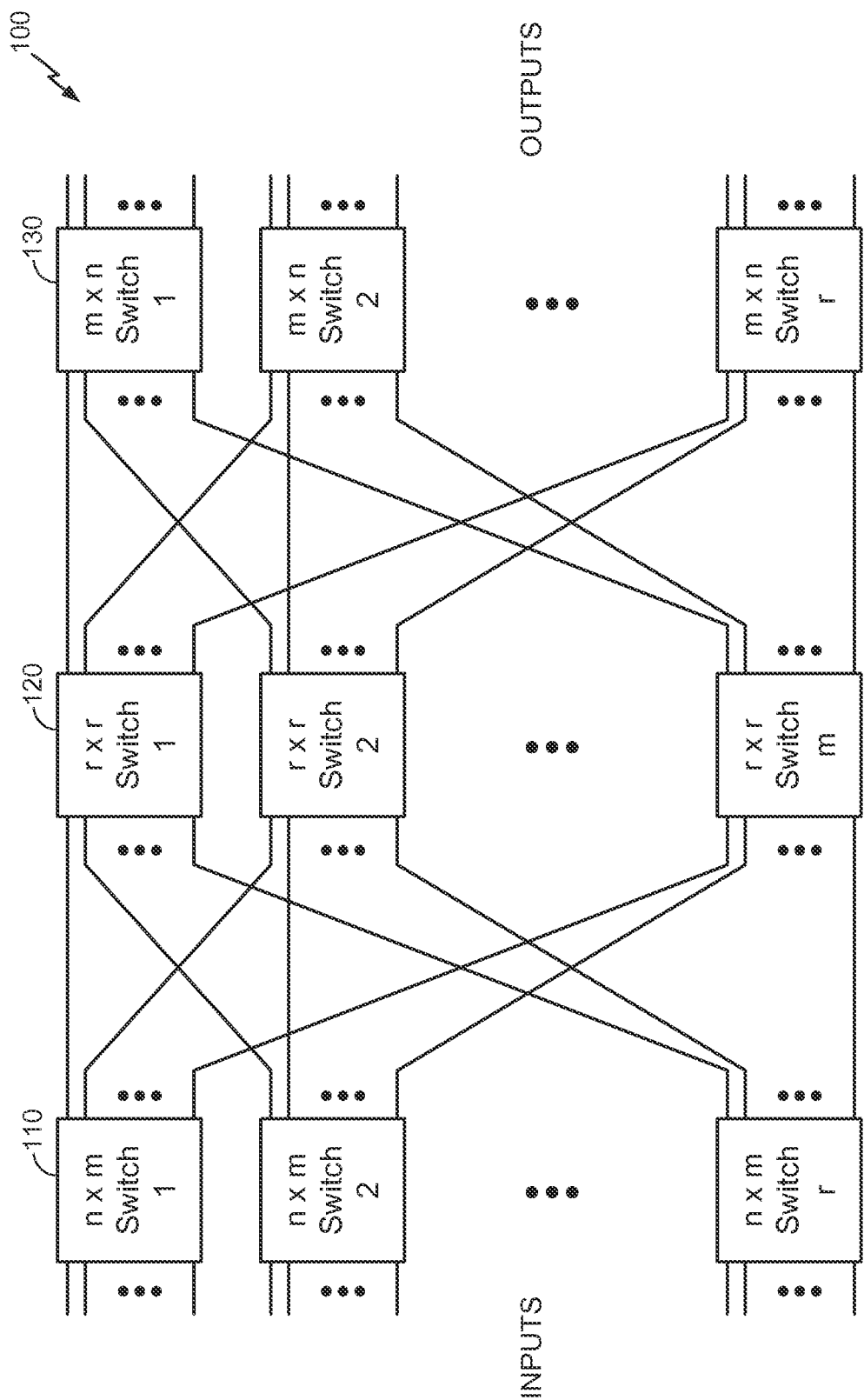
FIGS. 1A, B, and C depict exemplary implementations of a three stage switch networks.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Methods, apparatus and systems for a switch network are provided. The exemplary methods, apparatus, and systems disclosed herein advantageously address the long-felt industry needs, as well as other previously unidentified needs, and mitigate shortcomings of the conventional methods, apparatus, and systems. For example, an advantage provided by the disclosed methods, apparatus, and systems herein is an improvement in a switched communication network.

Various aspects are disclosed in the following description and related drawings to show specific examples relating to exemplary implementations of the disclosure. Alternate implementations will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and implementations disclosed herein.

The word "exemplary" is used herein to mean "serving as an example, instance, or illustration." Any implementation described herein as "exemplary" is not necessarily to be construed as preferred or advantageous over other implementations. Likewise, the term "implementations" does not require that all implementations include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular implementations only and is not intended to be limiting of implementations of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element. Coupling and/or connection between the elements can be physical, logical, or a combination thereof. As employed herein, elements can be "connected" or "coupled" together, for example, by using one or more wires, cables, and/or printed electrical connections, as well as by using electromagnetic energy. The electromagnetic energy can have wavelengths in the radio frequency region, the microwave region and/or the optical (both visible and invisible) region. These are several non-limiting and non-exhaustive examples.

It should be understood that the term "signal" can include any signal such as a data signal, audio signal, video signal, multimedia signal, analog signal, and/or digital signal. Information and signals can be represented using any of a variety of different technologies and techniques. For example, data, an instruction, a process step, a command, information, a signal, a bit, and/or a symbol described in this description can be represented by a voltage, a current, an electromagnetic wave, a magnetic field and/or particle, an optical field and/or particle, and any combination thereof.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements. In addition, terminology of the form "at least one of: A, B, or C" used in the description or the claims can be interpreted as "A or B or C or any combination of these elements."

Further, many implementations are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the implementations described herein, the corresponding form of any such implementations may be described herein as, for example, "logic configured to" perform the described action.

In this description, certain terminology is used to describe certain features. The term "mobile device" can describe, and is not limited to, a mobile phone, a mobile communication device, a pager, a personal digital assistant, a personal information manager, a mobile hand-held computer, a laptop computer, a wireless device, a wireless modem, and/or other types of portable electronic devices typically carried by a person and/or having communication capabilities (e.g., wireless, cellular, infrared, short-range radio, etc.). Further, the terms "user equipment" (UE), "mobile terminal," "mobile device," and "wireless device," can be interchangeable.

FIG. 1A depicts an exemplary implementation of a multi-stage switch network. In FIG. 1A, a switch network 100 may include a plurality of ingress switches 110 where n is the number of inputs at an ingress switch 110, a plurality of middle stage switches 120 where m is the number of middle stage switches, and a plurality of third stage switches 130 where r is the number of third stage switches. The plurality of ingress switches 110 may include r switches similar to the third stage switches 130. The third stage switches 130 may act as egress switches with n outputs. Each of the plurality of switches 110 may be coupled to each of the plurality of middle stage switches 120. Each of the plurality of middle stage switches 120 may be coupled to each of the plurality of third stage switches 130. This arrangement may allow each input to a switch 110 to be routed through any middle stage switch 120 to any third stage switch 130.

For example, the network of FIG. 1A may be defined by three integers n, m, and r. n represents the number of sources that feed into each of r ingress stage crossbar switches. Each ingress stage crossbar switch has m outlets, and there are m middle stage crossbar switches. There is exactly one connection between each ingress stage switch and each middle stage switch. There are r egress stage switches, each with m inputs and n outputs. Each middle stage switch is connected exactly once to each egress stage switch. Thus, the ingress stage has r switches, each of which has n inputs and m outputs. The middle stage has m switches, each of which has r inputs and r outputs. The egress stage has r switches, each of which has m inputs and n outputs.

The relative values of m and n may define the blocking characteristics of the network 100. The blocking characteristics may be strictly non-blocking (SNB), wide-sense non-blocking (WSNB), and rearrangeably non-blocking (RNB). For example, if m≥2n−1, the network may be strictly non-blocking, meaning that an unused input on an ingress switch can always be connected to an unused output on an egress switch, without having to re-arrange existing connections through the network. Assume that there is a free terminal on the input of an ingress switch, and this has to be connected to a free terminal on a particular egress switch. In the worst case, n−1 other connections are active on the ingress switch in question, and n−1 other connections are active on the egress switch in question. Assume, also in the worst case, that each of these connections pass through a different middle-stage switch. Hence in the worst case, 2n−2 of the middle stage switches are unable to carry the new connection. Therefore, to ensure strict non-blocking operation, another middle stage switch is required, making a total of 2n−1. The above description may not apply to an arbitrary multicast scenario.

If m≥n, the network may be rearrangeably nonblocking, meaning that an unused input on an ingress switch may always be connected to an unused output on an egress switch, but for this to take place, existing connections may have to be rearranged by assigning them to different middle stage switches in the network. For example, consider m=n, with the network fully utilized—that is, r×n connections in progress. Any permutation of these r×n input terminals onto r×n output terminals may be broken down into smaller permutations which may each be implemented by the individual crossbar switches in the network with m=n for unicast traffic.

Figure 1B:
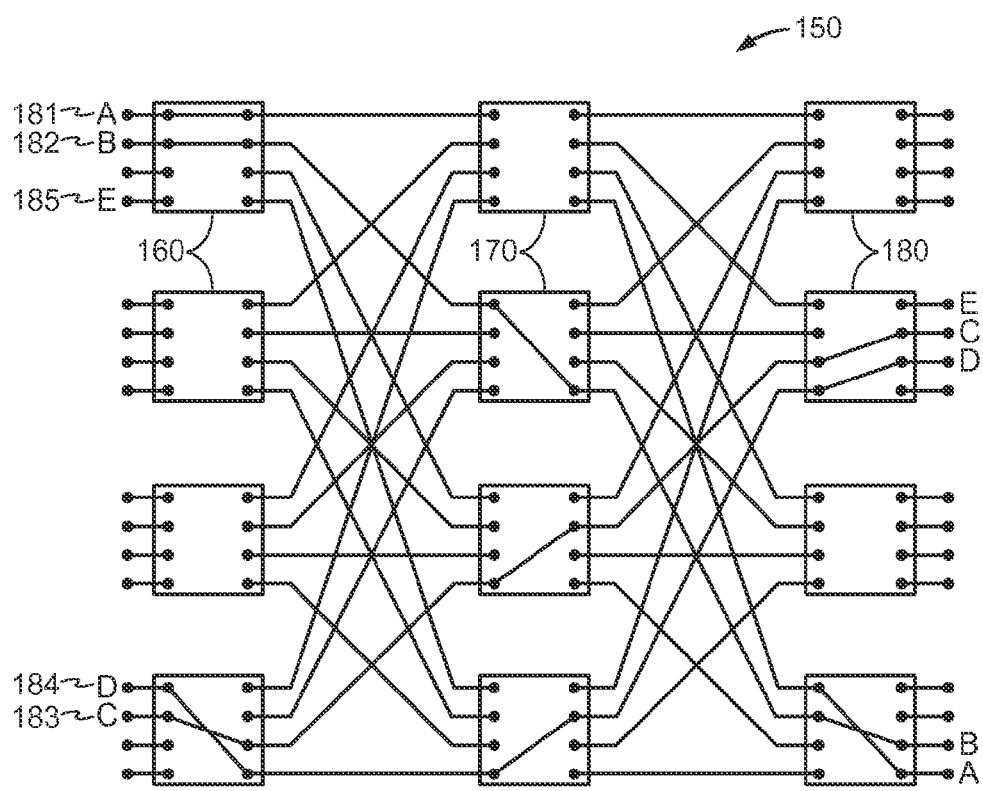
Figure 1C:
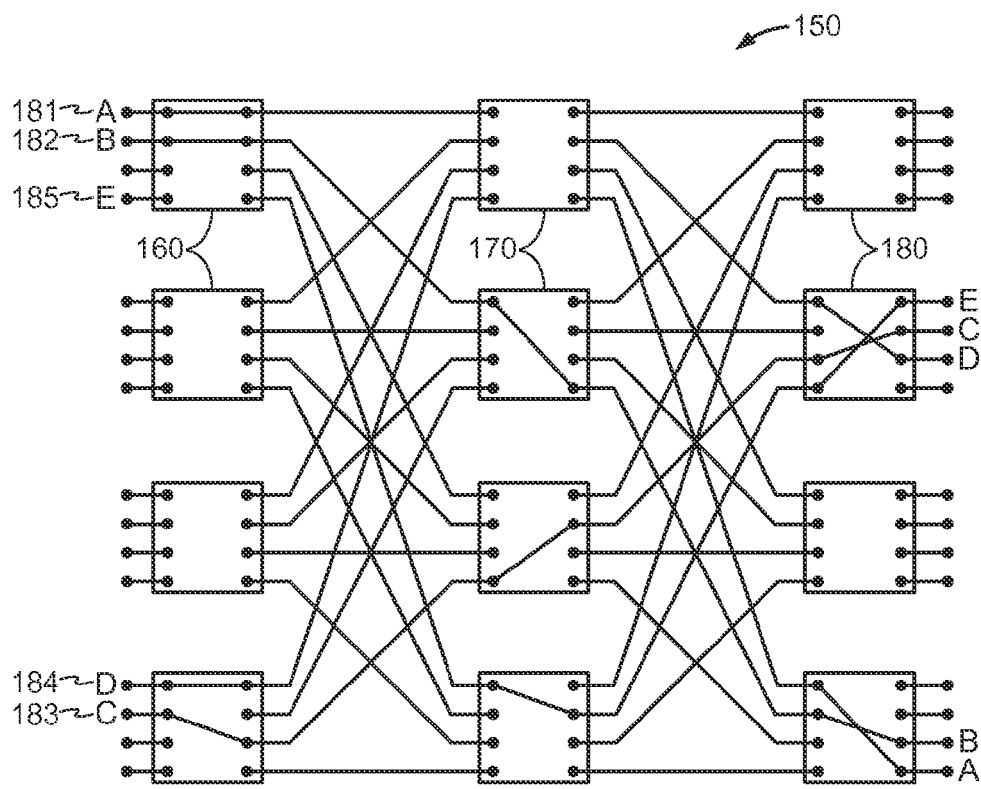

FIGS. 1B and 1C depict an exemplary implementation of a rearrangeable non-blocking network. In FIGS. 1B and 1C, a switch network 150 may include a plurality of ingress switches 160, a plurality of middle stage switches 170, and a plurality of third stage switches 180. In this example, the number of inputs (n) is four, the number of middle stage switches 170 is four (m), and the number of egress switches is four (r). Since the number of middle stage switches 170 equals the number of inputs, the switch is rearrangeably non-blocking. As shown in FIG. 1B, signals 181, 182, 183, and 184 are routed but signal 185 is blocked, unless a signal, such as 184 is rerouted. As shown in FIG. 1C, after signal 184 is rerouted, signal 185 can be routed and all the additional signals plus 185 are connected through the network 150 to the proper output for unicast traffic.

Figure 2:
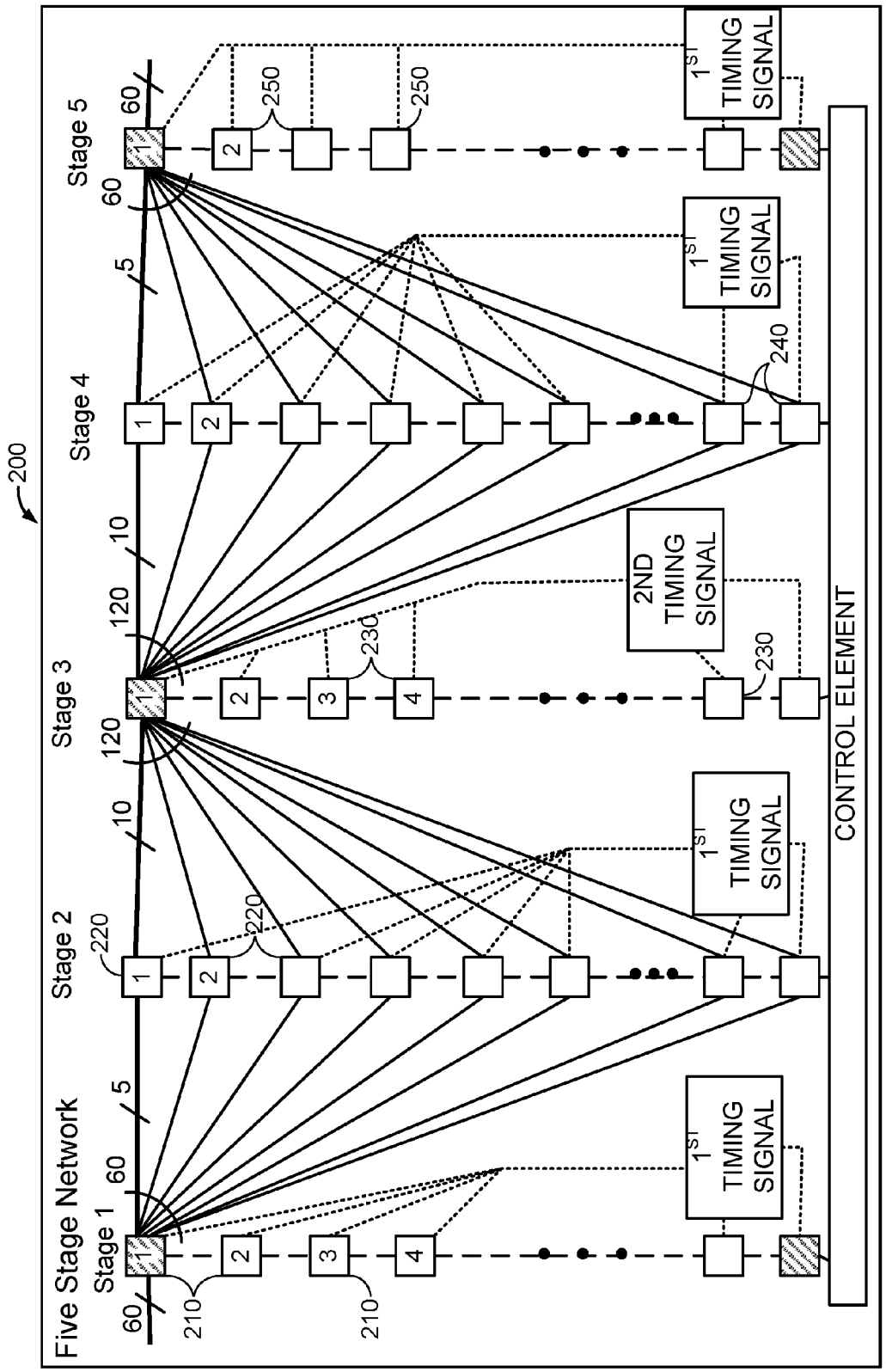
FIG. 2 depicts a block diagram of a five stage switch network.

FIG. 2 depicts a multi-stage switch network. While FIG. 2 shows a number of links specified in a certain form, the network is not restricted to these numbers. In FIG. 2, a switch network 200 may include a plurality of first stage switches 210, a plurality of second stage switches 220, a plurality of third stage switches 230, a plurality of fourth stage switches 240, and a plurality of fifth stage switches 250. The plurality of first stage switches 210 may act as ingress switches that receive a plurality of inputs. The fifth stage switches 250 may act as egress switches with a plurality of outputs. Each of the plurality of first stage switches 210 may be coupled to each of the plurality of second stage switches 220. Each of the plurality of second stage switches 220 may be coupled to each of the plurality of third stage switches 230. Each of the plurality of third stage switches 230 may be coupled to each of the plurality of fourth stage switches 240. Each of the plurality of fourth stage switches 240 may be coupled to each of the plurality of fifth stage switches 250. This arrangement may allow each input to a switch 210 to be routed through any second through fourth stage switch to any fifth stage switch 250.

Figure 3:
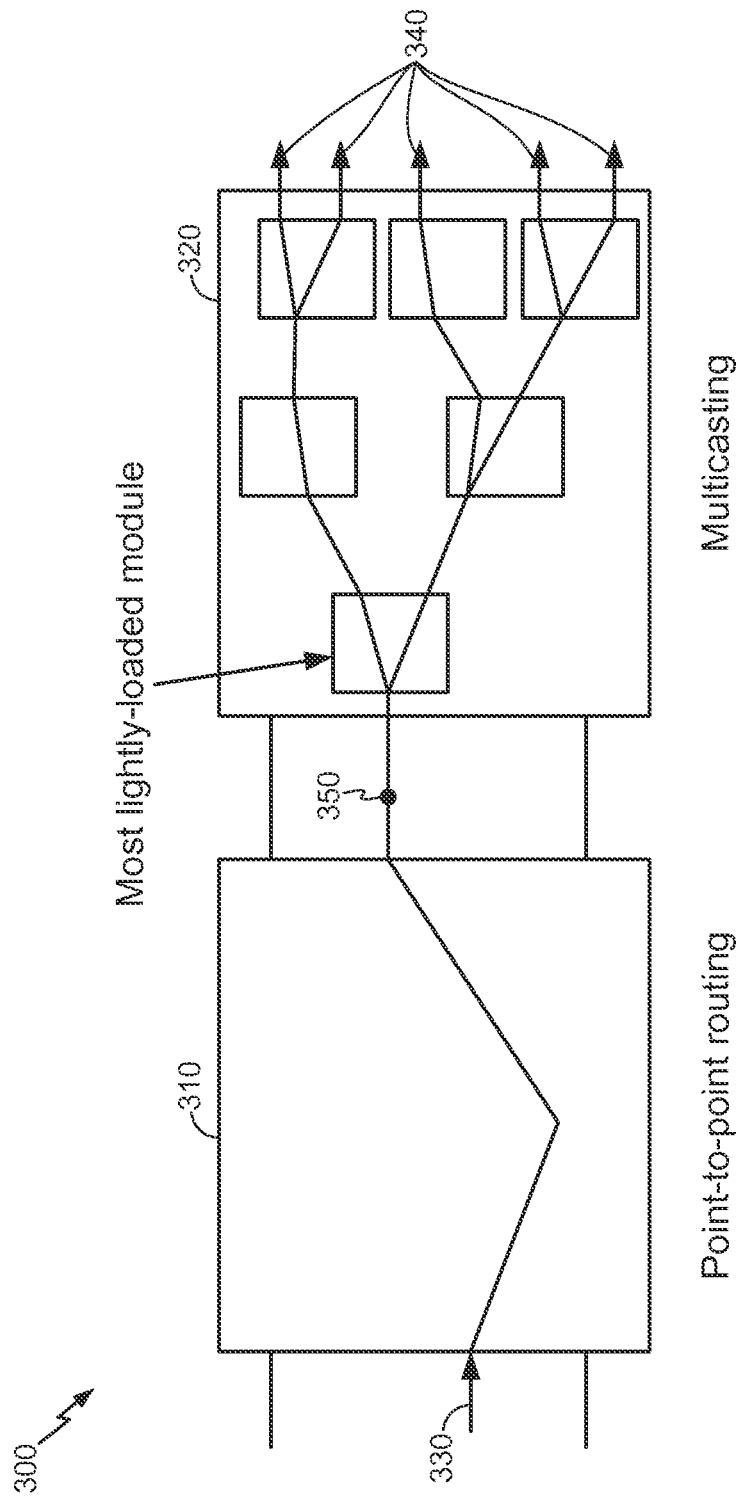
FIG. 3 depicts a block diagram of a cascaded network.

Some exemplary implementations may be capable of handling unicast or point to point routing as well multicast or point to multipoint routing and combinations thereof. A unicast routing is a routing where a single input is routed to a single output. A multicast routing is a routing where a single input is routed to a plurality of outputs. FIG. 3 shows a combination routing through a network. In FIG. 3, a switch network 300 may include a first switch network 310 and a second switch network 320. The switch network 300 may route a signal input 330 to a plurality of outputs 340 in a multicast manner. The first switch network 310 may route the signal input 330 through the first switch network 310 to a midpoint 340 in a unicast manner (point to point). The switch network 300 may then route the signal from the midpoint 340 through the second switch network 320 in a multicast manner (point to multipoint) to outputs 340. In one exemplary implementation, the midpoint 350 may be selected as the input of the most lightly loaded switch in a middle stage of the network 300.

In an exemplary implementation, a five stage switch network may be logical separated into two 3 stage networks where the third stage acts as the egress stage of the first switch network with three stages and as the ingress stage to a second switch network with three stages. For example, a multistage switch network may include five stages and this network may be separated into a first switch network and a second switch network. The first switch network having three stages with r ingress and r egress switches, each ingress or egress switch has n inputs. There are m center or second stage switches. The second switch network having three stages with r ingress and r egress switches, each ingress or egress switch has n inputs. There are m center or fourth stage switches. The ingress of the second switch network is the third stage of the multistage network and may act as both the egress of the first switch network and the ingress of the second switch network. This logical partitioning may be utilized with a routing algorithm to create two 3 stage switch networks cascaded together.

Figure 4:
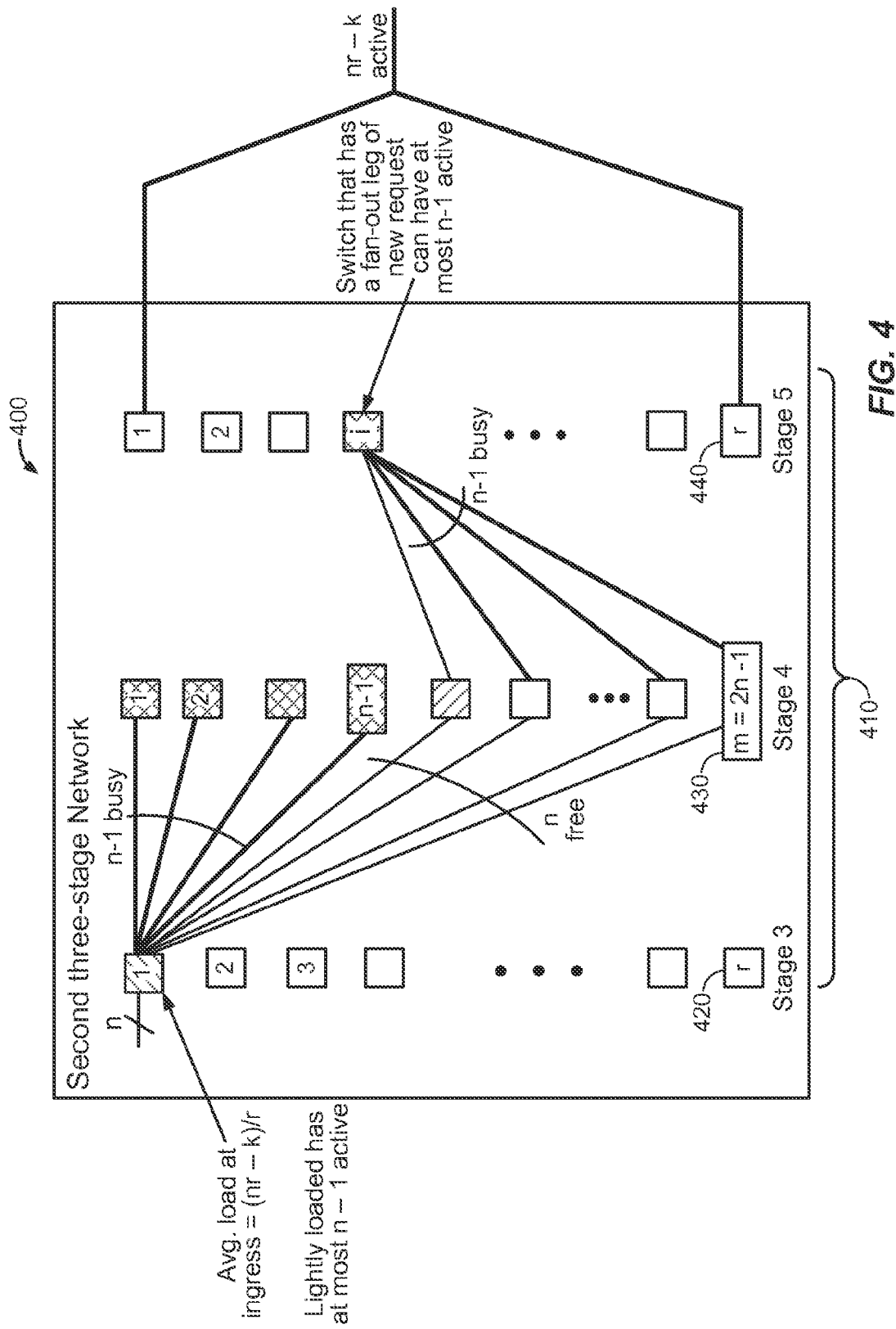
FIG. 4 depicts a block diagram of a second three stage switch network.

FIG. 4 shows a five stage network. In FIG. 4, a multistage switch network 400 may include five stages logically partitioned into 2 three stage switch networks. The second switch network 410 may include the third stage 420 of network 400 (first stage of network 410) as an ingress stage, the fourth stage 430 of network 400 (center stage of network 410) as a middle stage, and the fifth stage 440 of network 400 (egress stage of network 410) as the egress stage. The first and second stage of network 400 is cascaded with the second switch network 410 by combining the third stage 420 of network 400 as the egress of the first cascaded switch network and the ingress of the second cascaded switch network 410. For the cascaded networks to be wide-sense non-blocking for unlimited multicast, you need to have at least m=2n−1 center stages per three stage network (stage two and four of the five stage multistage network). Therefore, each network is strictly non-blocking for unicast. N may also be defined as N=rn as the max number of outputs. The implementation may take f multicast signal or connection requests and create f unicast requests mapped to the third stage of the first switch network. Then, the implementation may take the f unicast egress signals and create f unicast requests mapped from the third first stage of the second switch network to the third stage of the second switch network. Thus, a f multicast request may be routed through the five stage network as f unicast requests routed through two cascaded three stage networks.

The routing algorithm may find a lightly/least loaded first stage switch (third or egress stage in the first switch network) in the second switch network that may have at least n free links to center stage of the second switch network (fourth stage of the five stage network). Since there are at most N−1 outputs connected to a subset of inputs (need at least one free output to make a new connection), looking at the total number of links from input to center stage, it averages $(N-1)/r=n-1/r$ per ingress switch. The lightly loaded switch will have at most n−1 used links. Since there are m=2n−1 center stages, then it has at least $(2n-1)-(n-1)=n$ free links to the center stage. The same for egress to center stage. For each of the free outputs there are at least n free links to the center stage. Since there are m=2n−1 center stages, so we can find at least one common link for each multicast egress (n links from ingress to center and n links from egress to center stage may have one overlap with 2n−1 center stages). This may be done for each of the multicast legs and build the multicast tree over the three stages. The second switch network may support unlimited multicast if the input is from the least loaded ingress switch. Combined with first switch network, which is completely non-blocking for unicast signals, an input may be directed to a least loaded first stage switch in the second switch network. This implementation may provide unlimited unicast support with cascaded two strictly non-blocking switch networks.

In one implementation, the first switch network may be made rearrangeably non-block by making m=n for unicast transmission. The second switch network may be a multicast network and may be made rearrangeably non-blocking by also making m=n and may include some speed up of the center stage. The cascaded networks may include speed up in the input and output (i.e. not all N=rn inputs and outputs are active) and may include n greater or equal to r where r is the number of first and fifth stage switches. In this implementation, assume the total output is $N'=N-r*\Delta$. $\Delta$ may be the speed up per ingress/egress chip or stage of the second switch network. Then, the implementation may convert a multicast request to an equivalent group of unicast connections. The implementation may use any unicast rearrangeably non-blocking algorithm to complete the routing and convert the group of unicast back to multicast.

Figure 5:
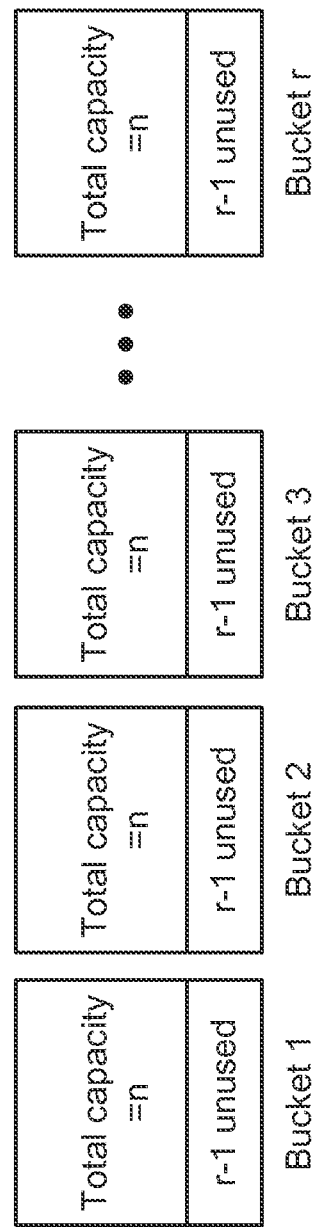
FIG. 5 depicts a graphical representation of exemplary implementation described herein.

FIG. 5 illustrates routing concepts with bucket diagrams. In these implementations, the network may convert the multicast connection request to unicast routing steps. For every multicast input to the second switch network, the multicast input may be converted to a group of unicast inputs. To convert to unicast inputs, for each multicast output/leg with a unique egress switch, a unicast connection may be added. With egress replication, all the outputs of the same egress switch may only need one unicast connection. For example, for an input with x outputs, create max of x modulo r (if zero, make it r) unicast connections. The result is always less than or equal to x.

These unicast connections may be made as a group. Each group size is always less or equal to r. The sum of all of these unicast connections obtained from each of the multicast inputs in total will be less than or equal to N'. The process for assignment of the third stage switch for each group may be done by the following (the center stage becoming the fourth stage):

assign a group to first ingress switch;
repeat this until you cannot fit any more groups for first switch;
At the end of the process if there are still groups left, the first switch will have at most r−1 timeslots free;
Repeat this for $2^{nd}$, 3rd, etc until you run out of groups; and
At end of this process, you may at least support (n−r+1) inputs per ingress and the speed up is r−1 per ingress.

Two ways of picking the center stage include (1) packing connections onto a third stage switch until the switch is not usable anymore and (2) looking at the lightly loaded switch.

The first approach may have a constant time complexity to achieve this packing at the ingress of the second stage by looking up where it can fit. Alternatively, other methods such as the second approach of assigning the connections to the third stage based on load for example (i.e the number of links used by the switch) are available, which can prevent hotspots in the fabric.

The routing for the second switch network may use any unicast rearrangeably non-blocking algorithm to complete the routing. This may be done by converting the group of unicast back to a multicast tree since they are all assigned to the same ingress switch. After the conversion back to multicast tree in the second network, the first switch network may be used to route the input to the root of the multicast tree at the second switch network defined by the above process. The resulting multicast network is a rearrangeable non-blocking type. The process of converting to unicast and then mapping the request based on the algorithm above to the third stage can also be achieved to create a 5 stage wide-sense nonblocking network if m=2n instead of n.

As shown in FIG. 5, assume that each ingress switch in the second network is a bucket with capacity n. There are r such buckets each with spare capacity (speedup) of r−1 $w_1, w_2 \ldots w_k$ are the requests with weights (fan-outs) $f_1, f_2, \ldots f_k$. The sum of total requests may not exceed the bandwidth of the switching network without speedup. Thus, $$f_1+f_2+f_k<=r*(n-r+1)$$

Max $f_i$=r=maximum fan-out request

In some implementations, the requests may be assigned to buckets (e.g. the buckets may represent switches, then the n−r+1 is n−(r−1) where r−1 is the speedup required per switch) such that all requests are assigned to some bucket and no bucket has more than its capacity assigned to it. In some implementations, this may always be done (bucket by bucket in total time O(k)). For example, in a worst case scenario, a connection cannot be fit to any bucket. This may result in wasted capacity in a bucket. This capacity can be at most 'r−1' because, if there are 'r' or more, and connection(s) are remaining to be assigned to buckets, any connection may be picked and assign to this bucket since each connection has a max request of r.

By extension, each of the r buckets may have r−1 capacity wasted in the worst case. However, in such a situation, all connections have already been assigned. This is because the total capacity of requests assigned already=(n−(r−1)) per bucket in each of the r buckets=r*(n−r+1), which is the totality of the input requests. Thus, all connections may be fit to the buckets (i.e. the switch fabric may be non-blocking for arbitrary multicast).

In some implementations, a speed up may be needed of r−1 timeslots per switch. For example, the second network may have 12 ingress (24 logical) switch and 24 egress switches. Thus, r=24. The total number of timeslot per third stage switch per period is 60*138=8280. The speed up that may be required is 8280/(8280−r+1)=0.28%.

In some implementations, fourth stage replication may not be necessary because all connections may be treated as unicasts at stage 3. A buffer of 9.6 µs in stage 4 may not be needed since the logical view with each time slot (TS) being a space switch can create a network with m>=n. Thus, all connections may maintain the same TS used on Stage 3 to Stage 4 on Stage 4 to Stage 5 as well. This implementation may come at the expense of possibly more rearrangements due to reduced flexibility (time slot interchange (TSI) not used) but since speedup of ~20% is used, it would reduce the probability of requiring rearrangement and the convergence time per rearrangement (which is already deterministic without speedup). This approach may work for a space switch or a TST switch, etc.

In some exemplary implementations, the network may include a control element that controls the routing of connections and the switches within the network. The control element may also perform the routing or rearrangement algorithm. In some exemplary implementations of the control element used with a five stage network, the control element may:
  convert any f-cast request to f unicast requests
  Find a third stage that can accommodate these f unicast requests
  define a cross-connect map in both the first and second networks that can accommodate the f unicast requests
  optionally run the first and second networks in parallel and route the requests in parallel
  employ a rearrangement algorithm to add the unicasts
    Either route all existing connections with the new one (all-at-once by edge coloring)
    Or, achieve routing by an incremental algorithm such as Paull's rearrangement
  operate the first network so it does not replicate, it directs/re-distributes the input requests to the third stage switches
  operate the second network to handle all multicasts by doing ingress replication (stage 3)
  optionally use one of:
    Vectorized computations to improve convergence time by leveraging SIMD instructions
    Trade off space for time by increasing memory/cache usage to improve algorithm compute time (constant time for delete and highly efficient search and rearrange)
    Complexity is O(n+r) per connection
  compute reroute ~20K connections in <16 ms In some networks, a protection scheme is implemented to provide a protection path for instances when a failure in a switch or link occurs and traffic is rerouted. In some implementations, the routing algorithm for connection requests may implement the routing algorithm with the protection scheme as a condition to satisfy.

Figure 6A:
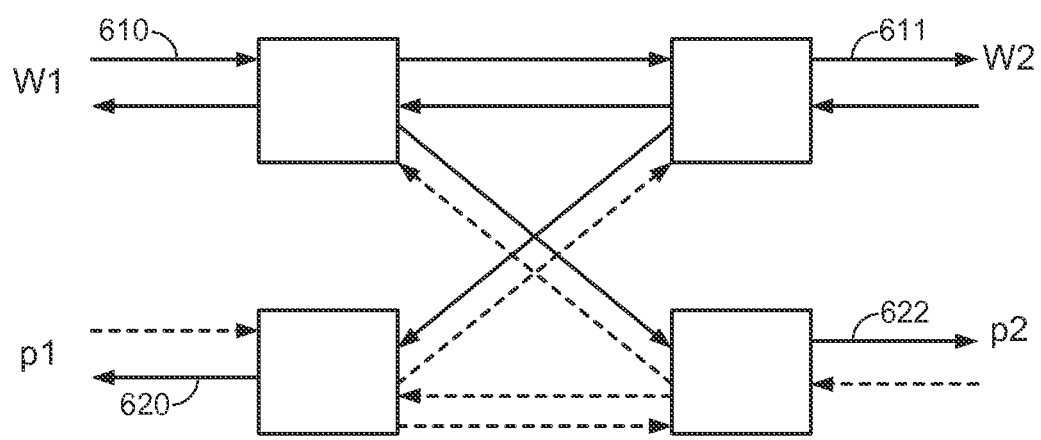
FIGS. 6A and B depict an exemplary implementation of a five stage switch network with protection links.

FIGS. 6A and B illustrate exemplary implementations for back to back protection (1+1, single side failure) in a five stage switch network wherein solid lines represent working connections before a failure. For protection scenarios, typically rearrangeable fabrics may need to rearrange connections causing delays. The techniques described herein may help reduce or avoid such rearrangements thereby improving the time required for the fabric to reroute connections under protection scenarios for both dedicated as well as shared protection since dedicated protection scenarios do not require rearrangement.

Figure 6B:
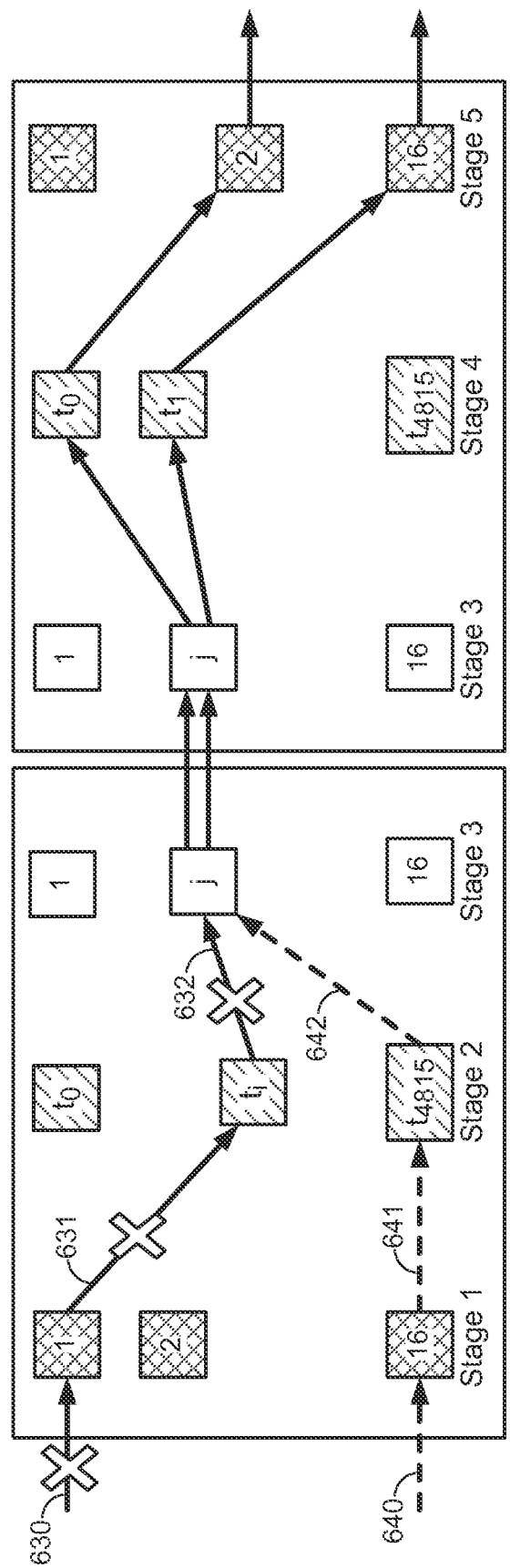

As shown in FIG. 6A, a network may include first working link 610, second working link 611, first protection link 620, and second protection link 622. As shown in FIG. 6B, when a working connection 630 fails, it can be rerouted along a protection connection 640. The routing connections 631 and 632 are deleted in the first switch network and new connections 641 and 642 connection may be added in the first switch network while no connection changes are needed in the second switch network. Thus, only two updates may be required among four connections. The diagram in FIG. 6B illustrates how a dedicated protection scenario in FIG. 6A at a node in the network can be achieved in the five-stage switching network of the node shown in FIG. 6B. Both the working and protection connections are pre-routed in the first three stage switching network as shown in FIG. 6B. Thus, during failure, configuration (shown in dotted) may be used without having to rearrange connections. Spare bandwidth in the first three stage network that does not do any multicast or replication makes this possible. As shown, rearrangement may be avoided and thus have minimal impact on the time required to activate the protection leg.

Figure 7A:
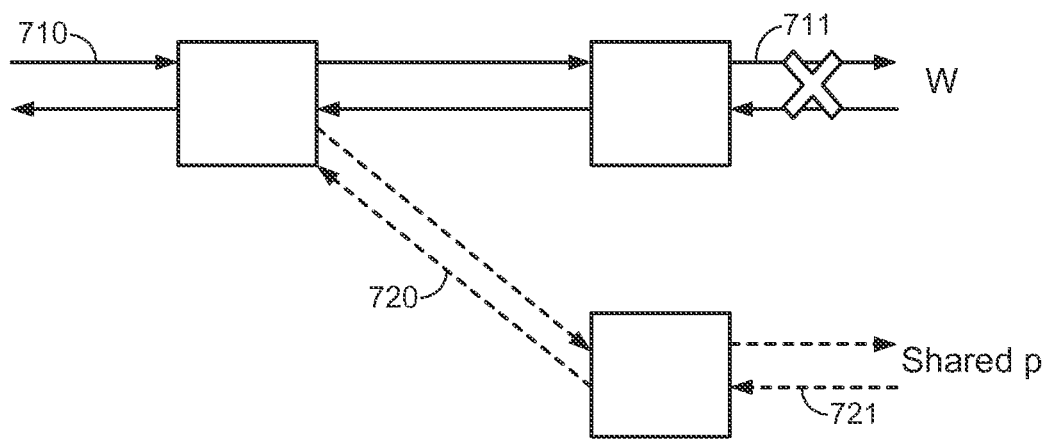
FIGS. 7A and B depict an exemplary implementation of a five stage switch network with protection links.

FIGS. 7A and B illustrate exemplary implementations for fast SMP (head/tail end node) in a five stage switch network wherein solid lines represent working connections before a failure. Fast SMP is a resiliency technique for networks to recover from local and network-wide multiple failures without the need to dedicate backup bandwidth for every active circuit. This technology may be implemented using a purpose-built hardware acceleration chip included in a network node device ensuring a sub 50 ms recovery. For example, if a failure occurs, fast SMP may protect the services in sub 50 ms, and then GMPLS technology may start recalculating backup paths in real time, and continuously updating the hardware tables across the network. In this way the Network Planning System, the GMPLS Control Plane, and the fast SMP Processor layer may be always synchronized. The figures illustrate how pre-routing in the switching network may be achieved and rearrangements avoided during a failure. The x marks, denoting a failure, in the figures are related. The B figure is a unidirectional view of routing the connection illustrated in A.

Figure 7B:
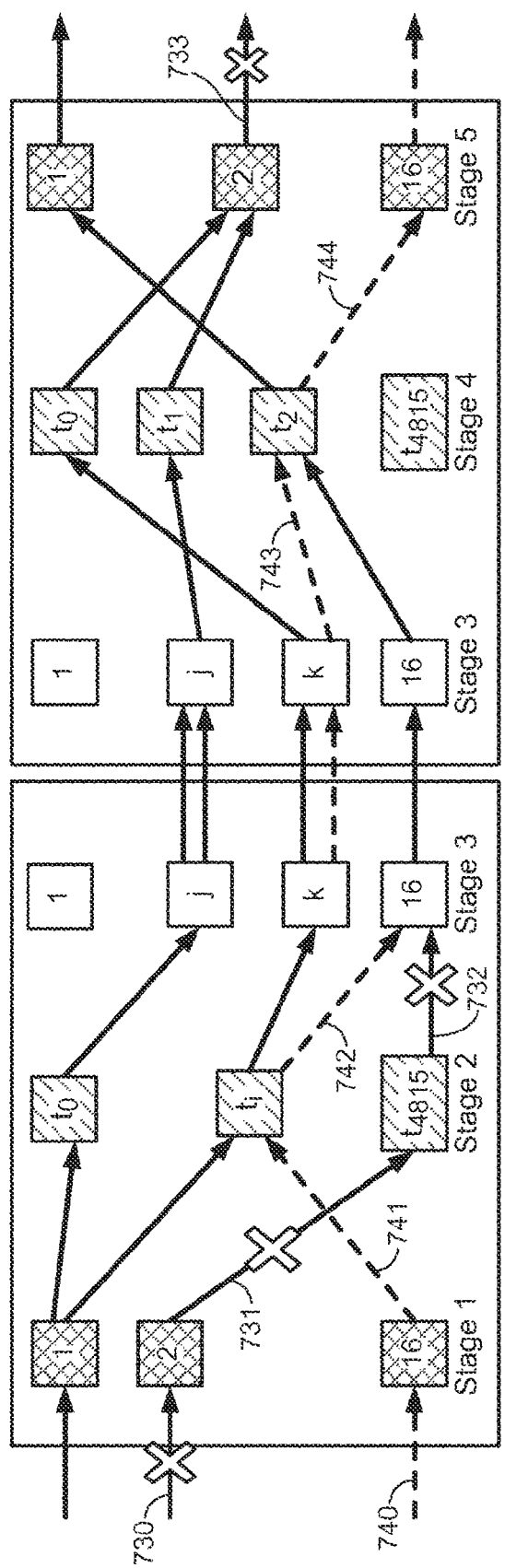

As shown in FIG. 7A for the head end or tail nodes, a network may include first working link 710, second working link 711, first protection link 720, and second protection link 721. As shown in FIG. 7B, when a working connection 730 fails, it can be rerouted along a protection connection 740. The routing connections 731 and 732 may be deleted in the first switch network and connection 733 may be deleted in the second network and new connections 741 and 742 connection may be added in the first switch network and connections 743 and 744 may be added in the second switch network. Thus, only four updates may be required among three connections for example. The figures illustrate how pre-routing in the switching network may be achieved and rearrangements avoided during a failure. The x marks, denoting a failure, in the figures are related. The B figure is a unidirectional view of routing the connection illustrated in A.

Figure 8A:
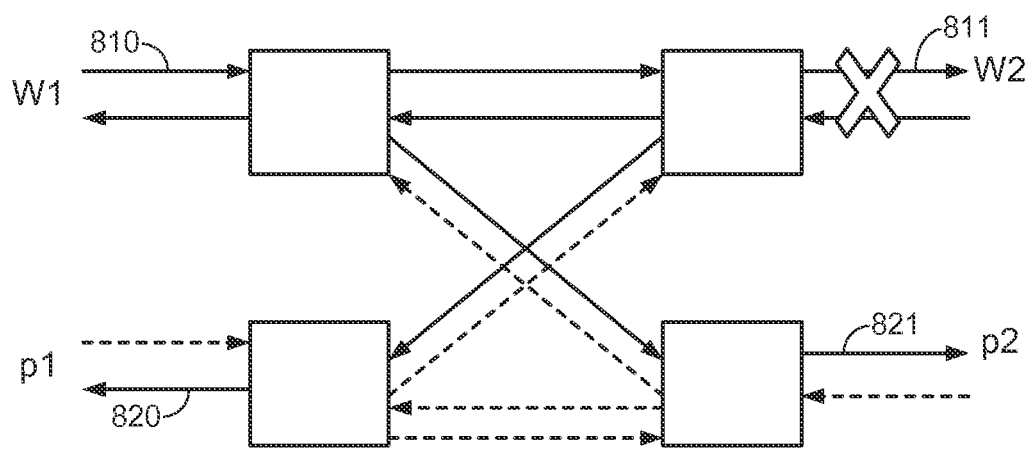
FIGS. 8A and B depict an exemplary implementation of a five stage switch network with protection links.
Figure 8B:
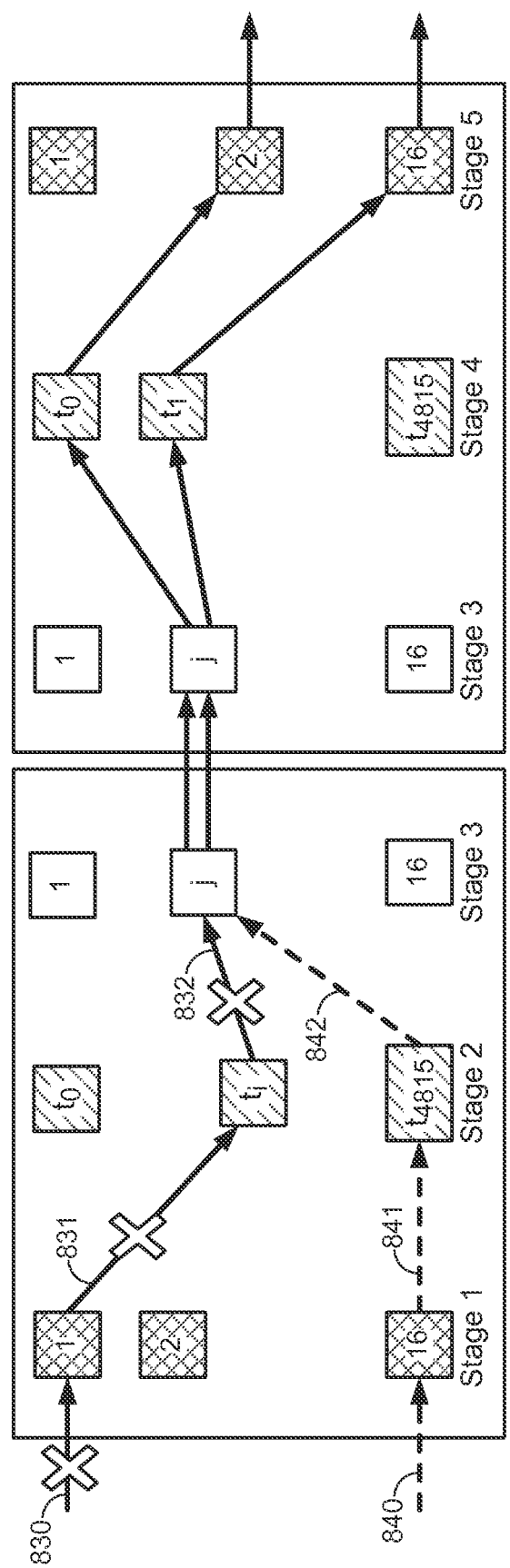

FIGS. 8A and B illustrate exemplary implementations for strictly non-blocking algorithm for dedicated protection with bounded sharing and fast SMP in a five stage switch network wherein solid lines represent working connections before a failure. As shown in FIG. 8A, a network may include first working link 810, second working link 811, first protection link 820, and second protection link 821. As shown in FIG. 8B, when a working connection 830 fails, it can be rerouted along a protection connection 840. The routing connections 831 and 832 may be deleted in the first switch network and new connections 841 and 842 connection may be added in the first switch network. Thus, only two updates may be required among four connections.

Figure 9A:
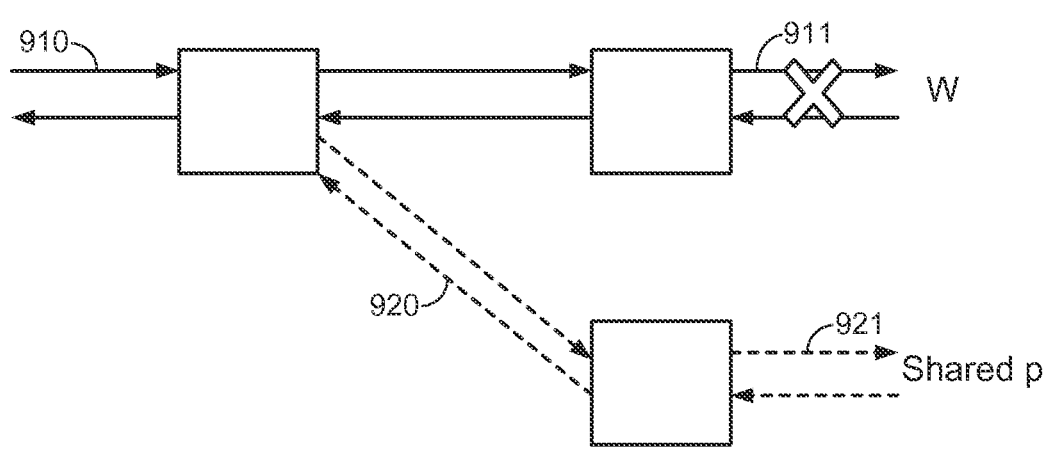
FIGS. 9A and B depict an exemplary implementation of a five stage switch network with protection links.
Figure 9B:
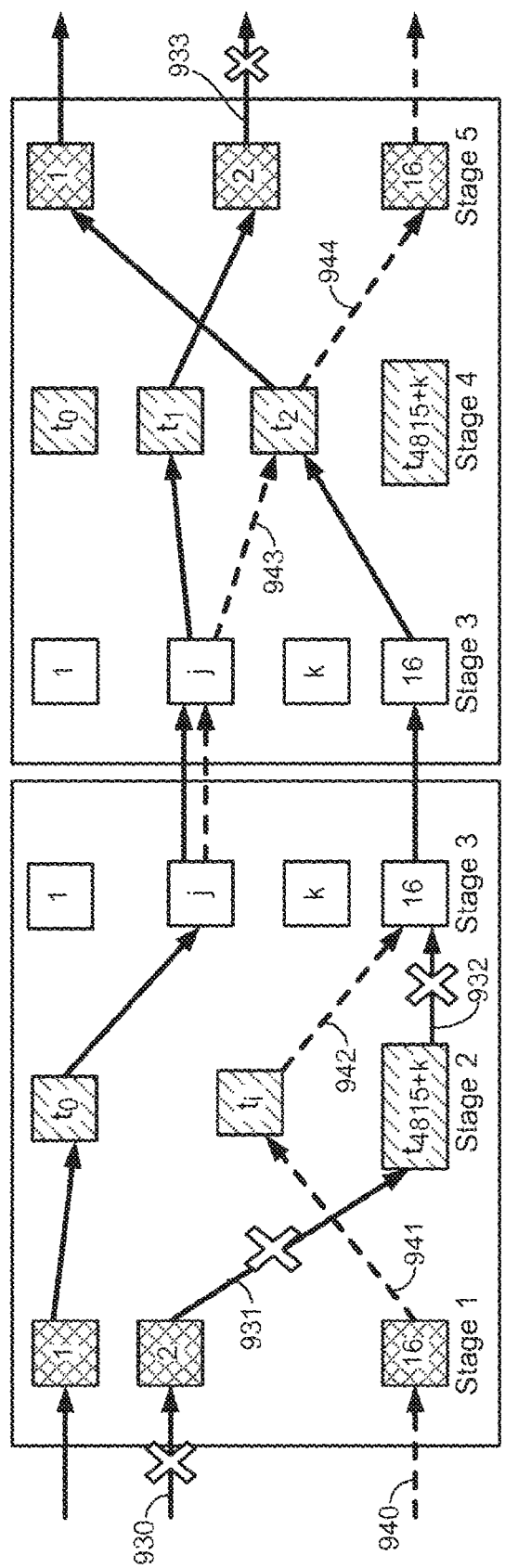

FIGS. 9A and B illustrate exemplary implementations for strictly non-blocking algorithm for dedicated protection with bounded sharing and fast SMP (with SMP optimization) in a five stage switch network wherein solid lines represent working connections before a failure. As shown in FIG. 9A, a network may include first working link 910, second working link 911, first protection link 920, and second protection link 921. As shown in FIG. 9B, when a working connection 930 fails, it can be rerouted along a protection connection 940. The routing connections 931 and 932 may be deleted in the first switch network and connection 933 may be deleted in the second network and new connections 941 and 942 connection may be added in the first switch network and connections 943 and 944 may be added in the second switch network. Thus, only four updates may be required among three connections.

In some exemplary implementations of the five stage network described herein, a combination of switch types may be used. In some implementations, the switches may all the same type of a combination of types such as time switches and space switches. For example, time switches may be used in stages 1, 3 and 5 and space switches may be used in stages 2 and 4 to avoid the necessity of a time slot interchanger. For example, in each three stage network, the ingress switch and link/middle stage may uniquely map to actual timeslot on the link from ingress switch to the next stage. Similarly, the second internal link and egress specify a TS on the link. The TSI may be computed by differential information:

Stage 1 TSI may be determined by looking at stage 2 and may be used for routing;

Similar for Stage 5 TSI, which may be determined from stage 4 logical switch used and the output; and Stage 3 TSI may be determined from Stage 2 used and Stage 4 used in the logical network.

This may save two row times for each connection as it traverses through the network and may save latency in the fabric.

In some exemplary implementations, a switch may be created from an odd number of layers of smaller sub-switches. Conceptually, the crossbar switches of the three-stage switch may each be further decomposed into smaller crossbar switches. Although each subswitch has limited multiplexing capability, working together they synthesize the effect of a larger N×N crossbar switch.

In some implementations, application of two different multiplexer approaches in alternate layers further reduces the cost of the switch network:

Space-division multiplexers are like the crossbar switches already described, or some arrangement of crossover switches or banyan switches. Any single output can select from any input. In digital switches, this may be an arrangement of and gates. For example, 8000 times per second, the connection is reprogrammed to connect particular wires for the duration of a time slot. In space-division systems the number of space-division connections is divided by the number of time slots in the time-division multiplexing system. This dramatically reduces the size and expense of the switching fabric. It also increases the reliability, because there are far fewer physical connections to fail.

Time division multiplexers each have a memory that is read in a fixed order and written in a programmable order (or vice versa). This type of switch permutes time-slots in a time-division multiplexed signal that goes to the space-division multiplexers in its adjacent layers. Time-division switches have only one input and output wire. Since they have far fewer electrical connections to fail, they are far more reliable than space-division switches, and may therefore be preferred switches for the outer (input and output) layers of the network.

Implementations of the methods, apparatus, and systems described herein can be used in a number of applications. For example, the described implementations could be used in optical communication networks as well as computing modules such as processors. Further applications should be readily apparent to those of ordinary skill in the art.

Nothing stated or illustrated depicted in this application is intended to dedicate any component, step, feature, object, benefit, advantage, or equivalent to the public, regardless of whether the component, step, feature, object, benefit, advantage, or the equivalent is recited in the claims.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some exemplary implementations, some or a plurality of the most important method steps can be performed by such an apparatus.

The exemplary implementations described above merely constitute an illustration of the principles of the present disclosure. It goes without saying that modifications and variations of the arrangements and details described herein will become apparent to other persons skilled in the art. Therefore, it is intended that the disclosure be restricted only by the scope of protection of the appended patent claims, rather than by the specific details presented on the basis of the description and the explanation of the exemplary implementations herein.

In the detailed description above it can be seen that different features are grouped together in exemplary implementations. This manner of disclosure should not be understood as an intention that the claimed exemplary implementations require more features than are explicitly mentioned in the respective claim. Rather, the situation is such that inventive content may reside in fewer than all features of an individual exemplary implementation disclosed. Therefore, the following claims should hereby be deemed to be incorporated in the description, wherein each claim by itself can stand as a separate exemplary implementation. Although each claim by itself can stand as a separate exemplary implementation, it should be noted that—although a dependent claim can refer in the claims to a specific combination with one or a plurality of claims—other exemplary implementations can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some exemplary implementations, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative implementations of the disclosure, it should be noted that various changes and modifications could be made herein without departing from the scope of the invention as defined by the appended claims. The functions, steps and/or actions of the method claims in accordance with the implementations of the invention described herein need not be performed in any particular order. Furthermore, although elements of the invention may be described or claimed in the singular, the plural is contemplated unless limitation to the singular is explicitly stated.

What is claimed is:

1. An apparatus comprising:
   a plurality of switch stages arranged in sequential stages;
   a first switch stage connected to a plurality of inputs, the first switch stage having a plurality of first switches configured to operate with a first timing signal, the first timing signal having a first frequency;
   a second switch stage having a plurality of second switches configured to operate with the first timing signal, the plurality of second switches being more than the plurality of first switches and each of the plurality of second switches connected to each of the plurality of first switches;
   a third switch stage having a plurality of third switches configured to operate with a second timing signal having a second frequency, each of the plurality of third switches connected to each of the plurality of second switches and wherein the second frequency is higher than the first frequency by a factor equal to a number of switches in the first switch stage divided by a sum of the number of switches in the first stage and a number of the plurality of inputs;
   a fourth switch stage having a plurality of fourth switches configured to operate with the first timing signal, the plurality of fourth switches being more than the plurality of third switches and each of the plurality of fourth switches connected to each of the plurality of third switches;
   a fifth switch stage connected to a plurality of outputs, the fifth switch stage having a plurality of fifth switches configured to operate with the first timing signal and each of the plurality of fifth switches connected to each of the plurality of fourth switches; and
   a control element configured to control each of the plurality of switch stages for routing a signal from one of the plurality of inputs to one of the plurality of outputs.

2. The apparatus of claim 1, wherein the control element converts a signal having multiple destination addresses to a plurality of signals each having a single destination address and routes the plurality of signals to a plurality of outputs.

3. The apparatus of claim 1, wherein the control element converts, at the third switch stage, a signal having multiple destination addresses to a plurality of signals each having a single destination address and routes the plurality of signals to a plurality of outputs.

4. The apparatus of claim 1, wherein the control element is configured to:
   generate a plurality of signals each having a single destination address based on a signal having multiple destination addresses received at one of the plurality of inputs; and
   route the plurality of single destination address signals through the plurality of switch stages.

5. The apparatus of claim 1, wherein the plurality of switch stages are rearrangeably non-blocking for signals having multiple destination addresses.

6. The apparatus of claim 1, wherein each of the plurality of switch stages comprises a plurality of switches of a respective switch type operating in parallel to each other.

7. The apparatus of claim 6, wherein the respective switch type comprises a space switch.

8. The apparatus of claim 6, wherein the respective switch type comprises a time slot interchange.

9. The apparatus of claim 6, wherein the plurality of switching stages alternates between time slot interchanges and space switches.

10. The apparatus of claim 1, wherein the plurality of switch stages are arranged as a first switch network and a second switch network connected as distinct devices.

11. The apparatus of claim 1, wherein at least one of the plurality of switch stages is configured to operate at a higher clock speed than at least one other switch stage of the plurality of switch stages.

12. The apparatus of claim 1, wherein the first timing signal and the second timing signal are clock signals.

* * * * *